United States Patent [19]

Bird

[11] Patent Number: 4,732,351

[45] Date of Patent: Mar. 22, 1988

[54] ANTI-ICING AND DEICING DEVICE

[76] Inventor: Larry Bird, 1715 Capital of Texas Hwy., Austin, Tex. 78746

[21] Appl. No.: 778,878

[22] Filed: Sep. 23, 1985

Related U.S. Application Data

[63] Continuation-in-part of Ser. No. 601,070, Mar. 21, 1985, abandoned.

[51] Int. Cl.$^4$ .............................................. B64D 15/00
[52] U.S. Cl. ............................ 244/134 D; 244/134 R; 244/134 F
[58] Field of Search ........... 244/134 R, 134 D, 134 F; 310/800

[56] References Cited

U.S. PATENT DOCUMENTS

| | | | |
|---|---|---|---|
| 4,283,461 | 8/1981 | Wooden et al. | 310/800 |
| 4,394,773 | 7/1983 | Ruell | 310/800 |
| 4,410,794 | 10/1983 | Williams | 244/134 D |
| 4,545,553 | 10/1985 | Finke et al. | 244/134 D |

FOREIGN PATENT DOCUMENTS 2106966  4/1983  United Kingdom ........... 244/134 D

*Primary Examiner*—Galen Barefoot
*Assistant Examiner*—Rodney Corl
*Attorney, Agent, or Firm*—J. Nevin Shaffer, Jr.

[57] ABSTRACT

Apparatus for the prevention of the formation and the removal of previously formed ice from the surface of various articles. A piezoelectric material is applied to environmentally exposed surfaces which are meant to be kept ice free. An available power source is adapted so that whatever the source, it is converted into an alternating current. A microprocessor is provided that, in accordance with the type of material used, its thickness, its currie point, and any other parameters of the specific piezoelectric material necessary for consideration, that it receives a current of the proper amplitude, duration, wave length, and shape which will realize the amount of movement or deformation of the piezoelectric material necessary to prevent ice formation. Further, the piezoelectric material is applied in a grid formation which enables the microprocessor to magnify the deformation of the material and to receive feedback information from specific areas as to the temperature, pressure, density, size of raindrops, etc., such that the proper utilization of the material may be emphasized and such that power requirements are greatly reduced by the necessity to provide power only to those areas where ice is actually forming.

10 Claims, 5 Drawing Figures

ANTI-ICING AND DEICING DEVICE

This application is a continuation-in-part of application Ser. No. 601,070 filed on Mar. 21, 1985, now abandoned.

BACKGROUND OF THE INVENTION

1. Field of the Invention

This invention pertains to a device which is designed to analyze present conditions and prevent the formation of and/or remove previously formed ice. The gist of the invention is the application of piezoelectric material to the outer surface of an object which is to be protected from ice formation. This material is connected by a set of electrodes through connecting all weather wiring to a power supply. The power supply may be either AC or DC initially. It is then converted into an alternating current and the voltage and wave form delivered to the piezoelectric material is monitored and controlled by a microprocessor. As the microprocessor feeds electrical pulses to the piezoelectric material, these polorized, crystalline structures realign themselves in the direction of the electrical field. This realignment causes a stretching, bending, or elongation of the material. On the removal of this electrical field, the polorized crystals return to their original position. This application of pulse electricity to this material results in its constant movement and secondarily, in the dissipation of heat, both of which work together to effect the removal of ice or the prevention of the formation of ice on the object to be protected. Additionally, information is retrieved from the material so that an analysis of the atmospheric conditions and physical activity along the material at various intermittent locations may be analyzed.

2. Description of Prior Art

While there are numerous types and designs of anti-icing and deicing devices, to the best of this inventor's knowledge, there has never been an invention such as this designed to uniformly and simultaneously prevent the formation of ice on, or remove ice from, certain objects. Specifically, with regard to employment of devices for general aviation aircraft, one method employed is a mechanical device which employs an inflatable balloon cover or "boot". This boot is inflated and is supposed to crack the ice layer. This device, however allows ice to form prior to removal and is easily damaged. Another method employed in aircraft is electrical heating elements. These elements are buried beneath the airfoil surfaces and are designed to keep the areas involved hot enough to prevent the formation of, or remove previously formed, ice. Nevertheless, these devices are inefficient and require large amounts of power for them to be operative. Further, they heat areas of the aircraft which are not covered with ice and they must generate enough heat to melt previously formed ice. Also, these devices are difficult and expensive to maintain. Another means utilized in aircraft deicing is the incorporation of exhaust gases blown across the surfaces desired to be kept ice-free. These devices are costly and inefficient in that they require a large amount of power from the aircraft in order to supply the hot air necessary to keep the desired areas ice-free. So much of this power is required that this device is less than effective at critical times such as take-off and landing when power is required elsewhere. Further, these devices are not available to aircraft without turbine engines.

Another method employed by aircraft is the use of deicing fluids. These systems are inaccurate in that they require spraying, dripping, or weeping of some fluid along the areas desired to be kept ice-free. Further, these devices require the provision of a large storage capacity on the aircraft to contain enough fluid necessary to keep the plane ice-free.

Ferren, UK Pat. No. 2,106,966 A, discloses a piezoelectric film which has electrodes on each side formed by conductive layers of aluminum to form a "piezoelectric element". This rudimentary device is connected with a power supply chosen to provide constant or constantly varied electrical vibrations to this "piezoelectric element". This device is highly inefficient because it requires a large amount of power in order to "vibrate" the entire element all at once. Further, no analysis of information is provided and the metal electrodes add weight, increase the radar receptivity, when used, and are easily damaged. Williams, U.S. Pat. No. 4,414,794, discloses a device which produces a cyclic supply of energy to ordinary airplane deicers in the form of electrical heaters. The Williams device is designed to protect a generator from overloading, when airplane heaters are energized, by providing a means for maintaining a constant load on an airplane generator while enabling the load to be shifted in phases to various heaters. As discussed, neither of these two devices provide the ability for the operator to determine the condition of the deicing element used, be it piezoelectric material or heater, and neither provides for the controlled vibration in regular and irregular patterns.

SUMMARY OF THE INVENTION

This invention consists of a piezoelectric material which is applied to the environmentally exposed surfaces of the object which are meant to be kept ice-free. This piezoelectric material has, in one embodiment, embedded within it metallic electrode connections, in an "X" "Y" grid pattern, to which electrical all weather wire is attached. This wire connects the material with the power system and an available power source, either AC or DC. This power source is adapted so that whatever the source, it is converted into an alternating current. The final element of this device is a microprocessor capable of being programmed. The microprocessor insures that, in accordance with the type of material used, its thickness, its curie point, and any other parameter, it receives a current of the proper amplitude, duration, wave length, and shape which will realize the amount of movement or deformation of the piezoelectirc material necessary to prevent ice formation. Further, the piezoelectric material itself will be generating an electrical field which the microprocessor will interpret to provide the system with information as to the temperature, pressure, density, size of raindrops, size of hail, size of ice, etc., such that the proper utilization of the material may be emphasized.

The microprocessor of the device will be in the form of a readily available off the shelf processor such as the Motorola 68,000, as is known in the art. The microprocessor will enable the users to select an address in X-Y Cartesian coordinate form and direct a high voltage signal to, that selected point. The selector will consist of demultiplexers and solid state relays, as are known in the art. The demultiplexers will determine which solid state relay to turn on based on X and Y values provided by the microprocessor. As previously stated, the material will have electrodes, either metallic or non-metallic, plated on both sides. These electrodes will be placed at the top and bottom of the material and at right angles to each other, thereby forming a pattern of squares, preferably one inch. The information necessary to program the microprocessor so that it can determine the exact location of a plurality of X, Y coordinates is readily known in the art. Having the ability to locate a specific spot of the material enables the user to determine a wide variety of information therefrom as previously discussed.

In a preferred embodiment the piezoelectric material will be formed to provide an upper and lower gridlike X, Y configuration formed of metallic electrodes, as it is known in the art. The preferred grid takes the form of one inch squares. This configuration enables the user to energize one layer of the grid and de-energize the other layer of the grid. When energized the piezoelectric material expands and when de-energized it shrinks. As a result, the grid enables the user to magnify the difference between the expanded and shrunken material, thereby, magnifying the movement effect. Additionally, the microprocessor has the ability to sense a plurality of X, Y locations as a result of the X, Y grid. Because the material itself generates a voltage when unenergized and when struck by some object or when some force is applied to it, as is known in the art, the ability to sense a plurality of locations when vibration is stopped enables the microprocessor to interpret and provide information such as the temperature, pressure, density, size of raindrops, size of hail, size of ice, airspeed and density of air, among other. Because of the sensitive nature of the material, it is even possible for it to determine airflow which makes the device very useful in another application for use in airfoil design. The primary benefit of the sensing ability of the system is that it can sense and focus energy where the deicing need is greatest, thereby, reducing power requirements and making the device efficient and practical.

A further embodiment of the device is the utilization of low resistance, electrically conductive piezoelectric material, as is known in the art, to form the X, Y grid thereby enhancing the durability and flexibility of the device, eliminating repairs of broken metal electrodes, decreasing the radar receptivity of the structure and reducing the weight of the device.

While this device is particularly well suited for application to general aviation aircraft, it is anticipated that other practical uses of the invention are readily available. That is, the device can be employed on oceangoing marine structures to prevent formation of ice on the superstructures, antennas, handrails, etc. Further, the device could be employed in use with radio antennas and antenna tower structures. Further, application can be envisioned for the use of the device on handrailings, automobiles, building roofs and sidings, glass, and transparent structural materials, as well as tubing, pipes, and cables.

The characteristics that further describe this device are that it requires a low power source, it is light weight in relative terms, inexpensive, does not substantially heat ice free surfaces, is accurate in its application, and does not require large storage areas. Further, it is available to all types of aircraft and other systems, not just those with turbine engines. Additionally, when it is in operation, it does not first allow ice to form nor does it have to raise the temperature of the surface to the melting point of ice. It is not easily damaged, it is cheap and easy to maintain, and, when applied to transmission devices, does not affect those transmissions, particularly when no metallic electrodes are used. Additionally a thin protective layer of flexible plastic material may be added over the piezoelectric material to provide weather and damage proofing.

The object of the invention is to provide a uniform and simultaneous anti-icing and deicing device that insures that ice formation will be prevented, or rapidly removed, by the utilization of a piezoelectric material which converts available electrical alternating current into mechanical force by realignment of its crystalline structures. This realignment causes the material to expand and retract in continuous motion and, thereby, prevents the ice formation.

BRIEF DESCRIPTION OF THE DRAWINGS

For a description of the construction and operation of the device of this invention, reference is made to the attached drawings and identical reference characters will be utilized to refer to identical or equivalent structures throughout the various views in the following detailed description.

DETAILED DESCRIPTION

Figure 1:
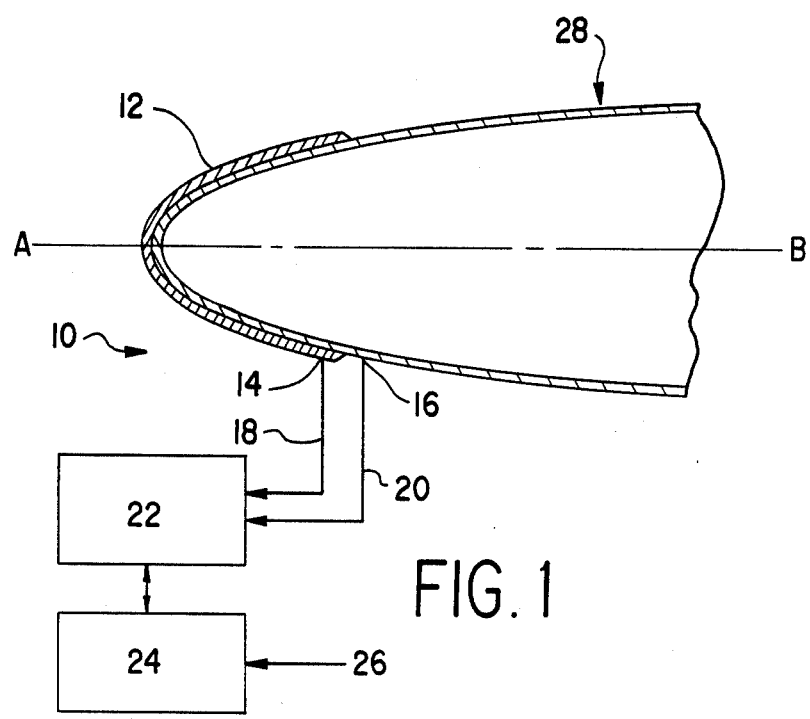
FIG. 1 is a cross sectional view along line A-B of the device in total.

Referring to FIG. 1, 10 denotes the invention itself consisting of the piezoelectric material 12 with two electrodes, 14 and 16, attached to which is a pair of all weather electrical wires 18 and 20. Said electrical wires 18 and 20 are attached to power supply 22. Power supply 22 converts AC or DC power to alternating current and is monitored by microprocessor 24 which modifies, monitors, and controls power delivery to piezoelectric material 12 through said connections 18 and 20. Said microprocessor 24 is powered by a remote power source 26, not shown.

Figure 2:
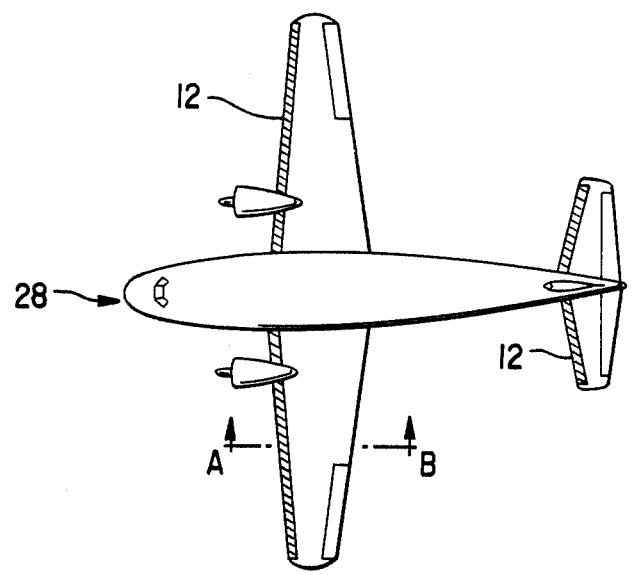
FIG. 2 is a top view of a general aviation aircraft illustrating the use of the device on such an aircraft.

FIG. 2 illustrates the use of the device 10, by indicating those areas of a general aviation aircraft 28 on which the piezoelectric material would be displaced. Those areas are the leading edge of the wings, propellers, windshields, and elsewhere along the aircraft as indicated.

Figure 3:
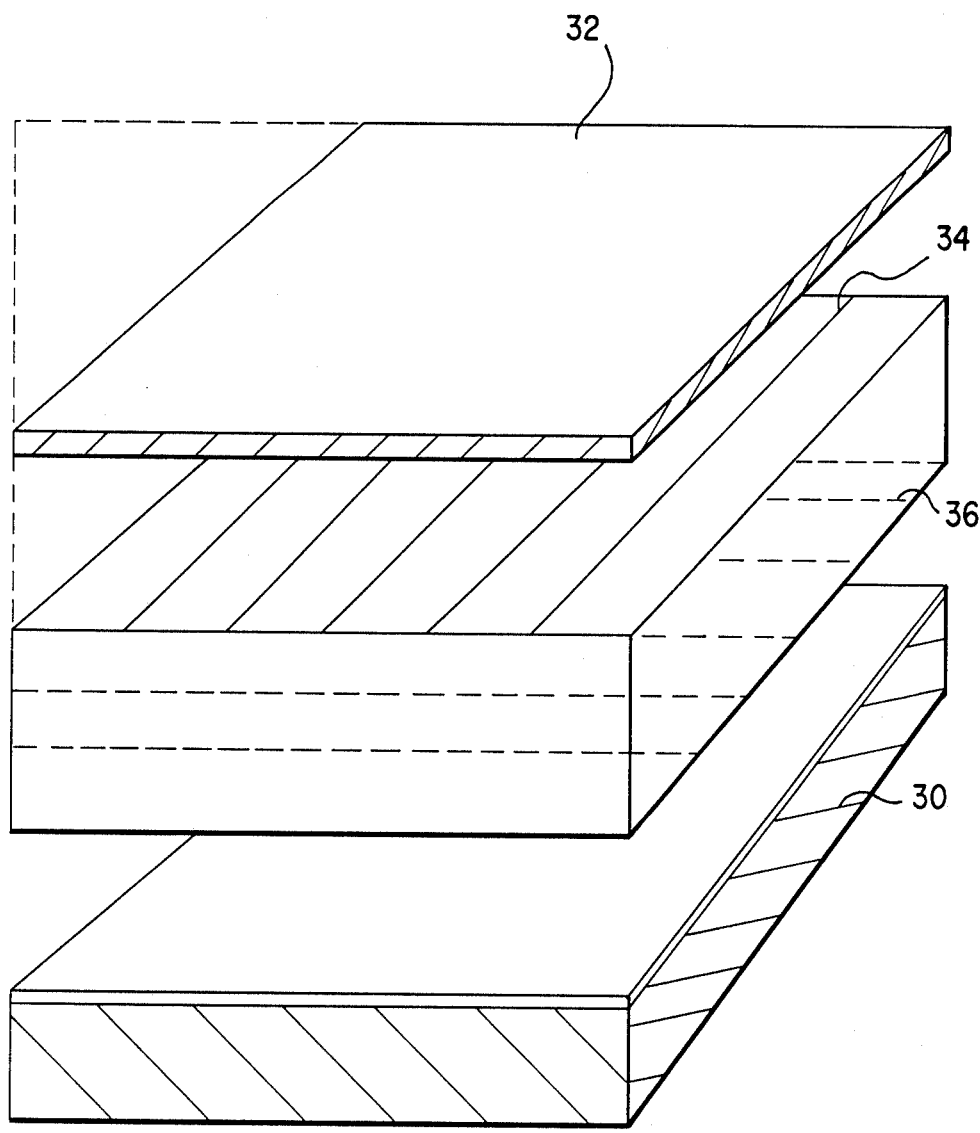
FIG. 3 is an exploded view of the device.

FIG. 3 illustrates an exploded view of invention 10 showing the piezoelectric material 12 sandwiched between the surface 30 of a structure to which the material is to be attached and protective plastic material covering 32. Also shown are X coordinate electrodes 34 and Y coordinate electrodes 36. These electrodes 34 and 36 are located at the top and bottom of piezoelectric material 12 and are formed in varying widths and lengths depending on the needs of the user. Further, said electrodes 34 and 36 may be of a non-metallic material.

Figure 4:
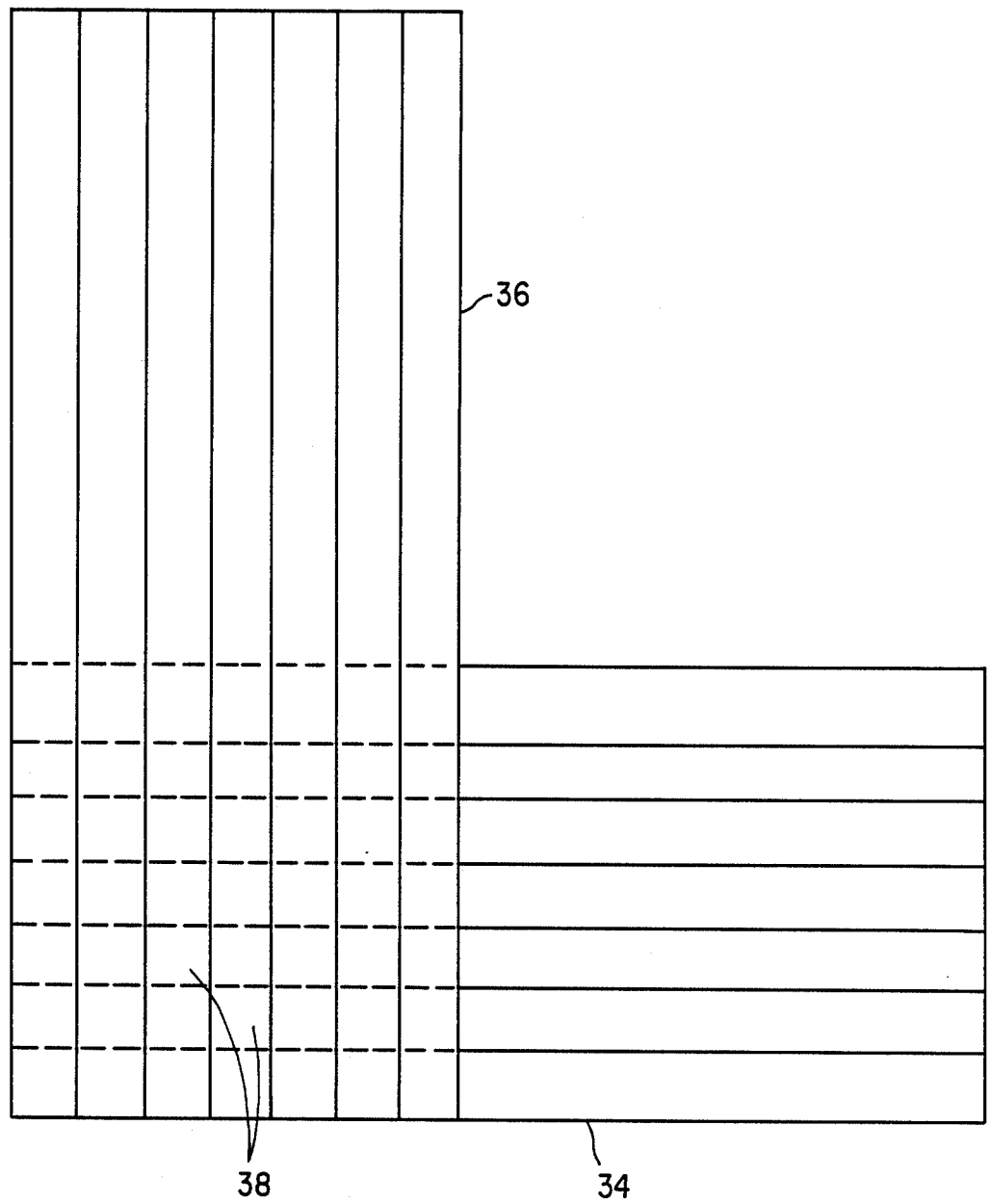
FIG. 4 is a top view of the X-Y grid formed by intersecting electrodes.

FIG. 4 is a top overview demonstrating the formation of the X coordinate 34 in conjunction with the Y coordinate 36 resulting in identifiable squares 38 of the material.

Figure 5:
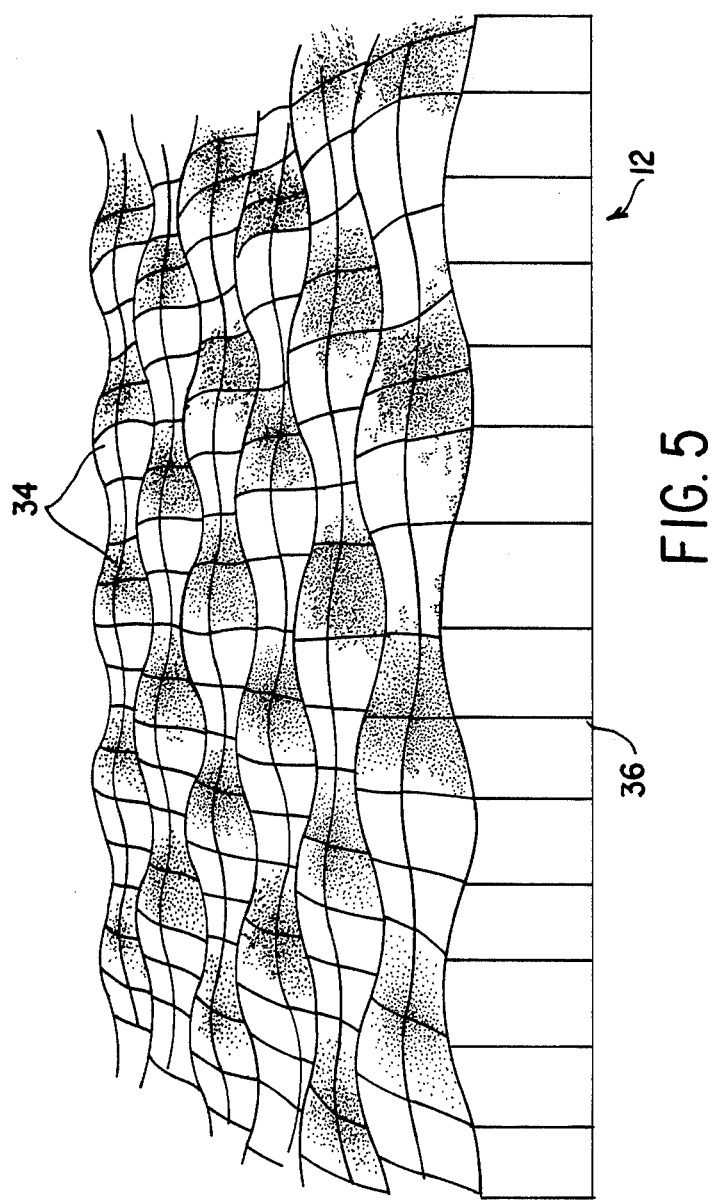
FIG. 5 is a side perspective view illustrating the maximized deformation of the material provided by the X-Y grid.

FIG. 5 is a side perspective view of material 12 illustrating the ability of the system to maximize the deformation of the material 12 by selectively expanding some areas by introducing voltage to that area and shrinking other area by de-energizing them.

Thus, according to this invention, by the application of the piezoelectric material to exposed surfaces as described above and connection of that material to a power supply through a microprocessor controller, it is possible to obtain uniform and simultaneous removal of ice, and prevention of ice formation, on exposed surfaces. The device is lightweight, inexpensive, easy to maintain and install, requires no large storage area, and does not suffer from any of the other debilitating defects of previous anti-icing and deicing devices. Most importantly, in the preferred embodiment, the material is displaced in a gridlike X, Y pattern so that energizing one layer of the material in the X direction while de-energizing the other layer will maximize the difference between the two, thereby, increasing the effectiveness of the movement of the material. Additionally, because of the plurality of X, Y coordinates formed by the grid, the microprocessor can lock on to, and look at, a plurality of non-moving points along the material. This enables the device not only to act as a deicer, but as a sensing means. As a further result, energy can be expended where energy is required, thereby overcoming the primary objection to previous piezoelectric applications which are, for all practical purposes, ineffective due to power limitations.

While the invention has been described in connection with the preferred embodiment, its utilization on general aviation aircraft, the inventor does not intend to limit the invention to the particular form set forth, but, on the contrary, it is intended to cover alternatives, modifications, and equivalents as may be included within the spirit and scope of the invention as defined by the appended claims.

What is claimed is:

1. An anti/deicing analyzing apparatus comprising:
   (a) an electrical power supply means;
   (b) a microprocessing means connected to said electrical power supply means;
   (c) a piezoelectric covering material, with an electrode grid located therein, connected to said microprocessing means; and
   a conversion device to convert electrical power into the alternating voltage and wave form needed to generate the desired movement and deformation of said piezoelectric material and to receive information in the form of voltage from said piezoelectric material.

2. An anti/deicing analyzing apparatus as recited in claim 1, wherein said microprocessing means connected to said electrical power supply means includes:
   (a) said microprocessing means being connected to said electrical power supply means, which directs electrical power to said piezoelectric material in a coordinated manner so that said material is manipulated when and as desired; and
   (b) said microprocessing means selectively isolates a plurality of locations on said piezoelectric material in order that said information from said material can be received and analyzed and so that said electrical power is applied only where deicing is required, thereby reducing electrical load on said electrical supply means.

3. An anti/deicing analyzing apparatus as recited in claim 2, wherein said piezoelectric covering material, with an electrode grid located therein, connected to said microprocessing means includes:

(a) a patterned, layered grid within said piezoelectric material which runs in at least two directions so that when an upper layer running in one direction is expanded by said microprocessing means, another, lower layer, running perpendicular to said upper layer can be shrunk thereby maximizing the difference between said layers and amplifying said deformation of said piezoelectric material; and (b) said piezoelectric material is in the form of films, sheets, and extruded shapes with metal electrodes attached thereto for connection with said power supply means and said microprocessing means.

4. An anti/deicing analyzing apparatus as recited in claim 3, wherein:
   said patterned, layered grid is formed of a metallic substance.

5. An anti/deicing analyzing apparatus as recited in claim 3, wherein:
   said patterned, layered grid is formed of a low resistance, electrically conductive, non-metallic substance.

6. An anti/deicing analyzing apparatus as recited in claim 3, wherein:
   said piezoelectric covering material includes polyvinylidene fluoride (PVDF), polyvinylidene chloride (PVC), polyvinyl fluoride (PVF), polytefrafluorodethylenepolyvinylidene fluoride (PTFE-PVF2) copolymers and ceramic polymer mixtures.

7. An apparatus for analyzing, preventing and removing formation of ice comprising:
   (a) an electrical power supply means;
   (b) a conversion device to convert electrical power into alternating voltage and wave forms needed to generate movement and deformation of piezoelectric material and to receive information in the form of voltage from said piezoelectric material;
   (c) a microprocessing means, connected to said electrical power supply means, which directs electrical power to said piezoelectric material in a coordinated manner so that said material is manipulated when and as desired;
   (d) said microprocessing means selectively isolates a plurality of locations on said piezoelectric material in order that said information from said material can be received and analyzed and so that said electrical power is applied only where deicing is required, thereby reducing electrical load on said electrical supply means;
   (e) a patterned, layered grid within said piezoelectric material which runs in at least two directions so that when an upper layer running in one direction is expanded by said microprocessing means, another, lower layer, running perpendicular to said upper layer, can be shrunk thereby maximizing the difference between said layers and amplifying said deformation of said piezoelectric material; and
   (f) said piezoelectric material is in the form of films, sheets, and extruded shapes with metal electrodes attached thereto for connection with said power supply means and said microprocessing means.

8. A method for analyzing, preventing and removing the formation of ice comprising the steps of:
   (a) providing an electrical power supply;
   (b) connecting a microprocessing means to said electrical power supply, which directs electrical power to piezoelectric material in a coordinated manner so that said piezoelectric material is manipulated when and as desired;

(c) connecting said piezoelectric material, with an electrode grid located therein to said microprocessing means, wherein said microprocessing means can selectively isolate a plurality of locations on said piezoelectric material in order that information from said material can be received and analyzed and so that said electrical power is applied only where deicing is required, thereby reducing electrical load on said electrical supply;

(d) constructing a patterned, layered electrode grid within said piezoelectric material, formed of a metallic substance, which runs in at least two directions so that when an upper layer running in one direction is expanded by said microprocessing means, another, lower layer, running perpendicular to said upper layer can be shrunk, thereby maximizing the difference between said layers and amplifying deformation of said piezoelectric material;

(e) connecting said piezoelectric material, in the form of films, sheets, and extruded shapes with metal electrodes attached thereto for connection with said power supply and said microprocessing means; and (f) connecting said power supply to a conversion device to convert said electrical power into alternating voltage and wave forms needed to generate movement and deformation of said piezoelectric material.

9. Method for analyzing, preventing and removing ice formation as recited in claim 8, further comprising the step of constructing said patterned, layered electrode grid of a non-metallic, low resistance, electrically conductive material.

10. Method for analyzing, preventing and removing ice formation as recited in claim 9, wherein said piezoelectric covering material includes:

utilizing a piezoelectric material in the form of films, sheets, and extruded shapes composed of material such as, polyvinylidene fluoride (PVDF), polyvinylidene chloride (PVC), polyvinyl fluoride (PVF), polytefra-fluorodethylene-polyvinylidene fluoride (PTFE-PVF2) copolymers and ceramic polymer mixtures.

* * * * *